United States Patent [19]

Goldie et al.

[11] Patent Number: 5,396,140
[45] Date of Patent: Mar. 7, 1995

[54] PARALLEL AIR GAP SERIAL FLUX A.C. ELECTRICAL MACHINE

[75] Inventors: James H. Goldie, Lexington; James Kirtley, Brookline, both of Mass.

[73] Assignee: SatCon Technology, Corp., Waltham, Mass.

[21] Appl. No.: 69,080

[22] Filed: May 28, 1993

[51] Int. Cl.⁶ .............................................. H02K 1/22
[52] U.S. Cl. ........................ 310/268; 310/114; 310/166; 310/184; 310/254; 310/261
[58] Field of Search ............... 310/268, 112, 114, 179, 310/180, 184, 156, 216, 254, 166, 261

[56] References Cited

U.S. PATENT DOCUMENTS

| | | | |
|---|---|---|---|
| 3,700,944 | 10/1972 | Heintz | 310/112 |
| 4,187,441 | 2/1980 | Oney | 310/268 |
| 4,371,801 | 2/1983 | Richter | 310/156 |
| 4,658,166 | 4/1987 | Oudet | 310/156 |
| 5,021,698 | 6/1991 | Pullen | 310/156 |
| 5,177,392 | 1/1993 | Scott | 310/268 |

Primary Examiner—R. Skudy
Attorney, Agent, or Firm—Iandiorio & Teska

[57] ABSTRACT

An a.c. electrical machine includes a plurality of first elements spaced from each other; a plurality of second elements spaced from each other and interstitially disposed with the first elements; a plurality of electrical windings on each of the first elements providing a current flow in a first direction; and a return for completing a magnetic flux path in a second direction perpendicular to the first direction on successive first elements and through the second elements for generating a force in a third mutually perpendicular direction between the first and second elements.

14 Claims, 6 Drawing Sheets

PARALLEL AIR GAP SERIAL FLUX A.C. ELECTRICAL MACHINE

FIELD OF INVENTION

This invention relates to an improved a.c. electrical machine, and more particularly one which utilizes a serial flux through a plurality of parallel air gaps.

BACKGROUND OF INVENTION

A.C. electric rotary machines such as motors and generators, and linear machines such as actuators of the induction and permanent magnet synchronous type, are generally used because they are extremely rugged, reliable, easy to control, and in particular have a high torque capacity and high power density ratings. Induction machines operate on the principle that current traveling in stationary coils or windings of a stator produce a rotating magnetic field which in turn produces a current in a rotor occupying the space where the rotating magnetic field exists. The induced current in the rotor reacts with the rotating magnetic field to produce a force. To obtain a linear motion, the stator and rotor are replaced with a stator and shuttle but the operating principle is the same.

Heretofore, it was believed that there was a fundamental limit to torque density in such machines caused by the fact that the interaction in an electric machine is between two solenoidal quantities: current and flux. Flux density is limited by material considerations; current density is limited by heating, by machine reactance considerations, and by the fact that too much current density can produce tooth tip saturation from leakage flux. Therefore, it was believed since power density was limited, the only way to increase power was to increase the volume of the machine.

For many applications where high torque is required, however, space is limited. For example, on a torpedo, actuator control space for torpedo steering may be limited to a cylindrical volume of less than 26 cubic inches, but require a torque capacity of 400 inch pounds. Conventional induction actuators do not have a torque density sufficient to meet these specifications.

SUMMARY OF INVENTION

It is therefore a primary object of this invention to provide an electrical machine in which torque capacity is increased for a given machine volume.

It is a further object of this invention to provide such an electrical machine in which the limit to torque density thought to exist in electrical machines is overcome by utilizing the same magnetic flux among one or more parallel air gaps.

It is a further object of this invention to provide such an electrical machine in which the magnetic flux is passed through multiple air gaps and interacted with surface current at each air gap, thereby increasing the torque density of the machine without significantly increasing the volume of the machine.

It is a further object of this invention to provide such an electric machine which may be operated as a rotary or linear machine.

It is a further object of this invention to provide such an electric machine which may be operated as a rotary or linear induction machine.

It is a further object of this invention to provide such an electric machine which may be operated as a rotary or linear permanent magnet synchronous machine.

It is a further object of this invention to provide such an electric machine in which force density is increased substantially by the number of air gaps present in the machine but the machine transverse direction is increased only by a smaller factor because the magnetic return path remains nearly constant.

This invention results from the realization that, contrary to conventional wisdom, an a.c. electrical machine may be constructed having increased torque while having a decrease, not an increase, in size by passing the same flux through multiple air gaps and interacting it at each gap with a surface current, so that the force density is multiplied by the number of gaps but the machine transverse dimension is increased only by a substantially smaller factor because it requires only one set of magnetic return paths.

In the most general sense, the invention features an a.c. electrical machine having a plurality of first elements spaced from each other, each including a plurality of magnetically isolated magnetic teeth. There are a plurality of second elements spaced from each other and interstitially disposed with the first elements. A plurality of electrical windings are on each of the first elements. Each winding is associated with a different group of magnetic teeth for providing a current flow in a first direction. There are return means for completing a magnetic flux path in a second direction perpendicular to the first direction through corresponding groups of teeth on successive first elements, and through the second elements for generating a force in a third mutually perpendicular direction between the first and second elements.

In a preferred embodiment, the machine may be a rotary machine in which the first elements are stators, the second elements are rotors, the first direction is radial, the second direction is axial, and the third direction is circumferential. Alternatively, the a.c. electrical machine may be a linear machine in which the first elements are stators, the second elements are shuttles, the first direction is circumferential, the second direction is radial, and the third direction is axial.

Broadly, in the rotary aspect, the invention features an a.c. rotary electrical machine having a plurality of axially spaced rotors, a plurality of axially spaced stators interstitially disposed with the rotors, and a plurality of magnetically isolated magnetic teeth on each of the stators. There are a plurality of electrical windings on each stator, each of which windings surrounds a different group of magnetic teeth. There are also return means including magnetic material for establishing a magnetic flux path axially in series through corresponding groups of teeth on successive stators and interstitial rotors, and azimuthally in the return means.

In a preferred embodiment the a.c. rotary electrical machine may be a rotary induction machine, in which case the rotors may each include a plurality of magnetic teeth, the number of teeth on each rotor being different from the number on each stator, and there may be a plurality of conductor paths surrounding the teeth on each rotor. The a.c. rotary electrical machine may also be a permanent magnet rotary synchronous machine in which the poles on the rotor are multiple and axially magnetized, and each pole in each multi-pole rotor induces a magnetic flux axially in the magnetic flux path, in series through corresponding groups of teeth on successive stators and the poles of the interstitial rotors.

More specifically, in the rotary form, this invention features a rotary induction machine which has a plurality of axially spaced rotors and a plurality of axially spaced stators interstitially disposed with the rotors. There are a plurality of magnetically isolated magnetic teeth on each of the rotors and stators, and the plurality of teeth on each rotor is different in number from the plurality of teeth on each stator. There are return means including magnetic material for establishing a low reluctance azimuthal flux path and a plurality of conductor paths surrounding the teeth on each of the rotors. There are also a plurality of electrical windings on each stator. Each winding surrounds a different group of magnetic teeth for inducing the magnetic flux axially in a path in series to corresponding groups of teeth on successive rotors and stators, and returning azimuthally through the return means.

In a preferred embodiment the rotors and stators may be disks, the magnetic teeth may be imbedded in the disks, and they may be laminated. The number of magnetic teeth on the stator may be greater than the number of magnetic teeth on the rotor. The rotors may be made of non-magnetic material and the stators may be made of non-magnetic, non-conducting material. The rotor may be made of conducting material for establishing the conductor paths. The electrical windings may be integral with each of the stators, and the return means may be generally disk-shaped members forming end caps of the machine.

Also more specifically in the rotary form, the invention features a permanent magnetic rotary synchronous machine having a plurality of axially spaced, axially magnetized multiple rotors. There are a plurality of axially spaced stators interstitially disposed with the rotors. Each stator includes a plurality of magnetically isolated magnetic teeth. There are return means including magnetic material for establishing a low reluctance azimuthal flux path, and a plurality of electrical windings on each stator. Each winding surrounds a different group of magnetic teeth. Each pole of each of the multipole rotors induces a magnetic flux axially in a path in series through corresponding groups of teeth on each stator, and the magnetic pole on each rotor, and returning azimuthally through the return means.

In a preferred embodiment the rotors and stators may be disks; the magnetic teeth may be embedded in the stator disk and may be laminated; the stator may be made of non-magnetic, non-conducting material; the rotor may be made of conducting material for establishing conductor paths; the electrical windings may be integral with the stator; and the return means may be generally disk-shaped members forming end caps of the machine. The axially magnetized rotors may include discrete axially polarized magnetic sections in each rotor, or they may include integrally formed axially polarized magnetic areas in each rotor.

Broadly, in the linear aspect, the invention features a linear electrical machine including a plurality of radially spaced shuttles, a plurality of radially spaced stators interstitially disposed with the shuttles, and a plurality of magnetically isolated magnetic teeth on each of the stators. There are a plurality of electrical windings on each stator, each of which windings is associated with a different group of magnetic teeth. There are also return means including magnetic material for establishing a magnetic flux path radially in series through corresponding groups of teeth on successive stators and interstitial shuttles, and axially on the return means.

In a preferred embodiment, the linear electrical machine may be a linear induction machine, the shuttles may each include a plurality of magnetic teeth, the pitch of the teeth in each shuttle being different from that on each stator, and there may be a plurality of conductor paths surrounding the teeth on each shuttle. Alternatively, the linear electrical machine may be a permanent magnet linear synchronous machine in which the shuttles are multipole and radially magnetized and each of the multiple shuttles induces a magnetic flux radially in series through corresponding groups of teeth in successive stators and the poles of interstitial shuttles.

More specifically, in the linear form, the invention features a linear induction machine including a plurality of radially spaced cylindrical shuttles, a plurality of radially spaced cylindrical stators interstitially disposed with the shuttles, and a plurality of magnetically isolated magnetic teeth on each of the shuttles and the stators, the pitch of the teeth on each shuttle being different from that of the teeth on each of the stators. There are return means including magnetic material for establishing a low reluctance flux path, and a plurality of conductor paths associated with the teeth on each of the shuttles. A plurality of electrical windings are disposed on each stator. Each winding is associated with a different group of magnetic teeth for inducing a magnetic flux radially in a path in series through corresponding groups of teeth on successive shuttles and stators and returning axially through the return means.

In a preferred embodiment the magnetic teeth may be embedded in the cylindrical stators and shuttles and they may be laminated. The shuttles may be made of non-magnetic material; the stators may be made of non-magnetic non-conducting material; the shuttles may be made of conducting material for establishing the conductor paths; and the electrical windings may be integral with each of the stators.

Also more specifically in the linear form, the invention features a permanent magnet linear synchronous machine having a plurality of radially spaced, radially magnetized multipole shuttles, a plurality of radially spaced stators interstitially disposed with the shuttles. Each of the stators includes a plurality of magnetically isolated magnetic teeth. There am first and second return elements including magnetic material for establishing a low reluctance axial flux path and a plurality of electrical windings on each stator, each of which windings are associated with a different group of magnetic teeth. Each pole of each of each multipole shuttle induces a magnetic flux radially in a path in series through corresponding groups of teeth on each stator and a magnetic pole on each shuttle, and returning axially through the return means. The shuttles and stators may be cylindrical; the magnetic teeth may be embedded in the stator cylinder and they may be laminated; the stators may be made of non-magnetic non-conducting material; the shuttle may be made of conducting material for establishing the conductor path; and the electrical windings may be integral with each of the stators.

The invention also features in a permanent magnet rotary synchronous machine a plurality of axially spaced, axially magnetized multiple rotors without teeth, and a plurality of axially spaced stators interstitially disposed with the rotors and also without teeth. There are return means including magnetic material for establishing a row reluctance azimuthal flux path and a plurality of electrical windings on each stator. Each pole of each multipole rotor induces a magnetic flux axially in a path in series through corresponding electrical windings in each stator and a magnetic pole on each rotor and returning azimuthally through the return means.

DISCLOSURE OF PREFERRED EMBODIMENT

Other objects, features and advantages will occur to those skilled in the art from the following description of a preferred embodiment and the accompanying drawings, in which.

Figure 2:
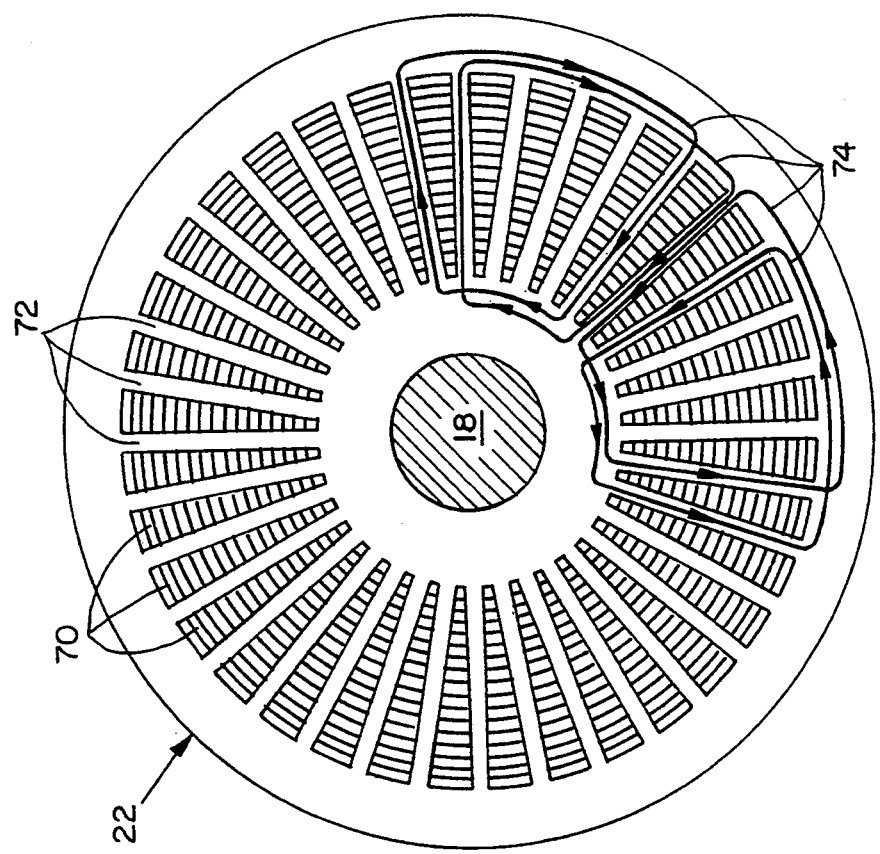
FIG. 2 is a plan view of a stator disk of the machine of FIG. 1 showing a portion of the windings for an induction or a permanent magnet synchronous machine.

This invention is accomplished in a.c. electrical rotary machines such as motors and generators and in linear machines such as linear actuators of the induction and permanent magnet synchronous type. The notion is to make machines with several air gaps interacting mechanically in parallel but using the same flux in series. This can be understood from the following explanation.

All machines are essentially shear-stress producers. The interaction in the machine may be considered to produce an effective shear across the air gap of the machine. Locally the shear is expressed as:

$$\sigma_z = K_x B_y \quad (1)$$

where y is the direction transverse of the air gap, which is radial in a conventional rotary machine; z is the direction of motion; and x is the mutually perpendicular direction, which is axial in a conventional rotary machine. $B_y$ then is flux density across the air gap, and $K_x$ is surface current density. Power is produced in the electrical machine by applying force to motion. In the case of a rotary machine the force becomes a torque and motion is simply rotation of the shaft. Higher rotational speeds implies higher ratings. But the fundamental limits on a machine are on air gap shear stress, and hence torque density. For machines with sinusoidal flux and current distributions, the upper bound for average value of shear stress is:

$$<\sigma> \leq K_x^1 B_y^1 \quad (2)$$

where $K_x^1$ and $B_y^1$ are root means square (RMS) values. There is a power factor associated with a shear force production mechanism. The power factor depends on a number of things including the operating point for induction motors operating near their intended rating. This power factor is usually not too far from unity. There are two fundamental limits to shear stress density: flux density and current density. Flux density is limited by material considerations. There is a limit to how much flux can be put through the teeth of a machine. Current density is limited by heating, by machine reactance and other factors. For example, too much current density can produce tooth tip saturation from leakage flux. Force density for an electrical machine, that is the force per unit volume, is surface or shear stress density divided by the machine thickness. In most electrical machines of non-trivial size the dimensions of the machine transverse to the air gap are dominated by a magnetic circuit. The thickness of the magnetic circuit required is:

$$t = \frac{B_g \lambda}{B_s 2\pi} \quad (3)$$

where $B_g$ is the transverse magnetic flux density in the gap, $B_s$ is flux density of the magnetic circuit and $\lambda$ is wavelength. Since magnetic return paths are required on both sides of the air gap, the volumetric force density is then expressed as:

$$F \leq \frac{\sigma}{t} \leq \frac{\pi K_x^1 B_s^1}{\lambda} \quad (4)$$

Increasing force density may involve reducing λ, the wavelength of the interaction. For a given surface speed, this means increasing frequency. While this is often done in aircraft and other applications, where generators are operated at 400 Hz, this too is constrained because the frequency is limited by material losses and by power supply considerations, and there is no possibility of increasing flux density since it is limited by the available materials. Thus the conventional wisdom is that there is a fundamental limit to machine power density caused by the fact that interaction in an electrical machine is between two solenoidal quantities: current and flux. Both of these physical quantities are conserved: voltage in a coil occurs because the coil and current in it surrounds the flux, but the magnetic field, and hence the flux, is produced because the lines of flux surround the current-carrying coils. The two physically conserved quantities must surround each other. The invention, then, results from the realization that it is possible to have more than one surface current interact with the same flux distribution and provide a way of passing the flux through more than one set of interaction surfaces. This is done by passing the same flux through multiple air gaps and interacting it at each gap with a surface current. Each of the interaction layers consists of magnetic surface elements, or teeth, which carry flux in the gap direction (transverse to both the surface current and the direction of motion), and current-carrying elements. The "slots" between teeth are open at both ends, unlike the case in a single interaction machine in which the slot bottoms are closed by magnetic return path. The force developed is multiplied by the number of gaps, but the machine transverse dimension is increased by a substantially smaller factor because it requires only one set of magnetic return paths. This is not the same as simply increasing the surface current density in a single air gap interaction. The use of multiple interaction surfaces does have the effect of increasing the surface current interacting with the single flux distribution, but by using multiple interaction surfaces with slots open at both ends, the slot leakage flux is sharply reduced. Further, this technique allows the use of fairly long wavelengths, reducing the impact of peripheral flux leakage. The invention then recognizes the use of multiple stators and rotors, or stators and shuttles. The air gap or magnetic gap is distributed. That is, the magnetizing current is distributed and the reaction current is distributed among all the interacting windings. Flux runs through the machine from end to end, or from inner to outer radius. The double open-ended slots reduce leakage reactance and the multiplicity of gaps reduces magnetizing reactance. As a result, the rating is some multiple of what the single gap version would have yielded, but with other performance parameters held to about what they would have been with just a single gap.

Figure 1:
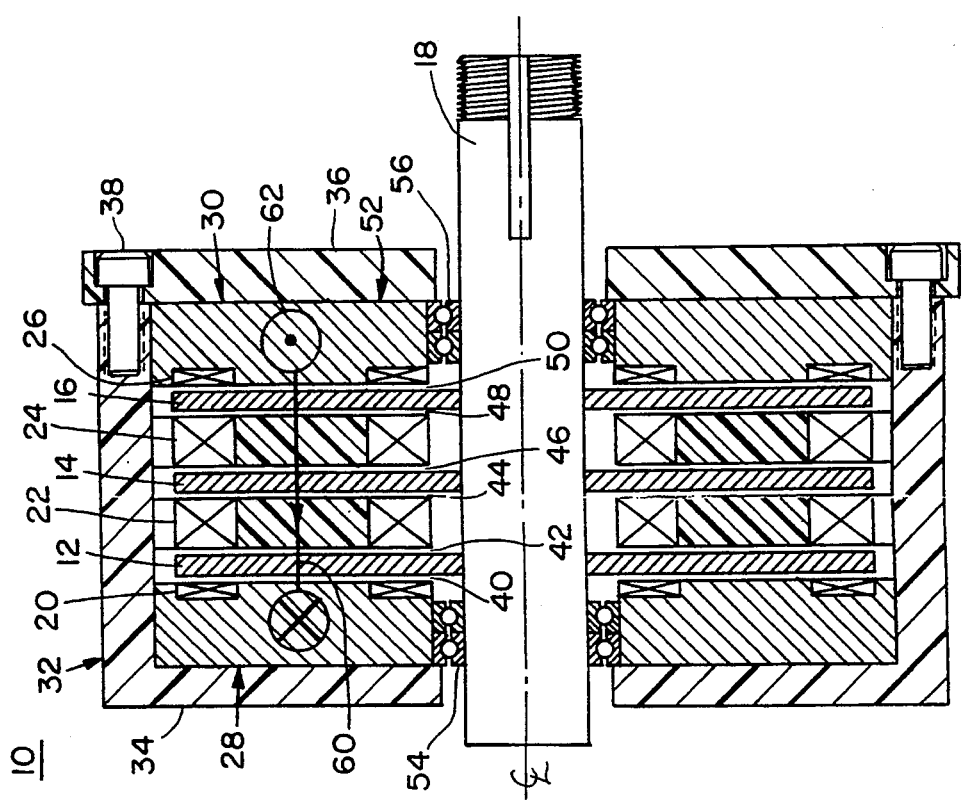
FIG. 1 is a diagrammatic cross-sectional view of an a.c. electrical rotary machine according to this invention.

There is shown in FIG. 1 an a.c. rotary electrical machine 10 according to this invention, which includes a plurality of rotor disks 12, 14, 16, mounted for rotation with main shaft 18. Interstitially disposed with rotor disks 12, 14 and 16 are a plurality of stator disks 20, 22, 24 and 26. While stator disks 20 and 26 at each end of machine 10 may be independently formed as are stator disks 22 and 24, this is not the case in FIG. 1. There the end stator disks 20 and 26 are integrally formed with end caps 28 and 30, which are made of magnetic material and form a part of the complete return element. Structure 32 is formed of cover 34 and end plate 36 bolted to cover 34 by means of bolts 38. The rotor disks and stator disks are separated by a series of parallel air gaps 40, 42, 44, 46, 48 and 50. Main shaft 18 is rotatably supported with respect to the stator assembly 52 by means of bearings 54 and 56. Machine 10 may be either an induction machine or a permanent magnet synchronous machine. In either case the flux path 60 has flux exiting 62 at end cap 30, axially transversing the machine through stator disks and rotor disks 26, 16, 24, 14, 22, 12 and 20, and entering the other end cap 28 so that a single serial flux path is being used for interaction with each of the rotor/stator air gap interfaces. The flux returns azimuthally through the end cap. The magnitude of the azimuthal flux density gradually diminishes, changes direction, and then gradually increases as explained subsequently with respect to FIG. 4.

For an induction machine or permanent magnet synchronous machine, a stator typified by stator 22, FIG. 2, is made of non-conducting, non-magnetic material and contains thirty-six teeth 70 separated by thirty-six slots 72. Teeth 70 are embedded in stator disk 22 and are laminated. Disk 22 carries a poly-phase stator winding using embedded conductors. The stators may be made such that there need be no parent disc (i.e., disc 22). Instead the windings are potted into the slots between the wedge-shaped teeth. Then excess "iron" is machined away. In this embodiment the winding is shown as a three-phase winding 74 having phases A, B and C. Only a portion of phase A is shown. In order to complete the phase A winding, the pattern of windings 74 is extended around the full 360° of stator disk 22. Phases B and C are identical with phase A, but they are displaced by four and eight slots, respectively, relative to A. In this manner each slot contains a side of two adjacent coils. This winding is denominated a six pole, three phase, two coils per pole per phase, 5/6 fractional pitch winding, but any suitable winding may be used. The end stator disks 20 and 26 are identical with the other stators having the same construction, number of teeth, and spacing. In this design there are twice as many windings in the intermediate stator disc as on the end stators. This need not be true, however.

Figure 3:
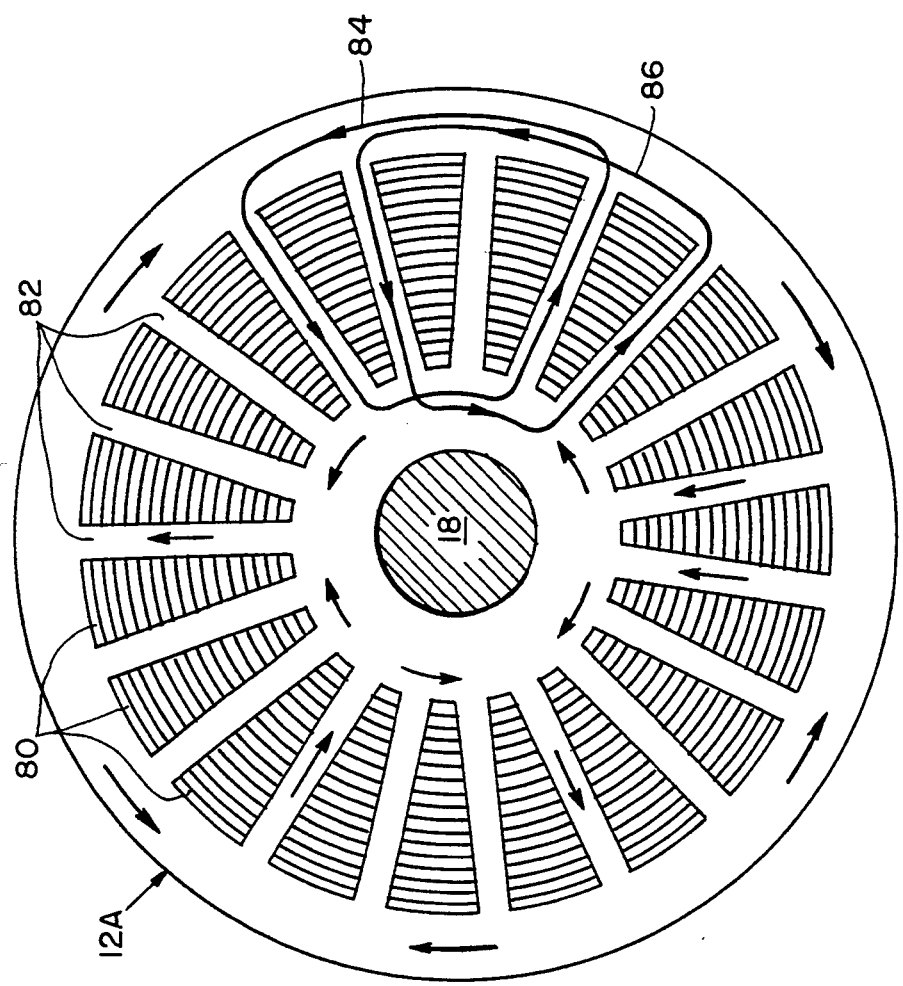
FIG. 3 is a plan view of the rotor disks of the machine of FIG. 1 showing the current flow for an induction machine.

A rotor disc 12a, FIG. 3, typifying a rotor used for an induction machine, is made of a conducting material such as copper or aluminum. It also includes a number of magnetic teeth 80 which may be laminated and are separated by slots 82. The number of teeth on rotor disc 12a differ from the number of teeth on its adjacent stators. In this case the rotors have nineteen teeth and slots, while the stator has thirty-six teeth and slots.

The current flow occurring in rotor disc 12a is similar to that in the stator. The currents flow in loops 84, 86, through the conductor present around rotor teeth 80. The discrete arrows appearing around the surface of rotor disk 12a indicate the current direction where the current is largest. In some slots and return path locations, there is little current at a particular instant pictured, so no arrow is present. There are six current loops present, which match the six poles of the stator winding.

Figure 4:
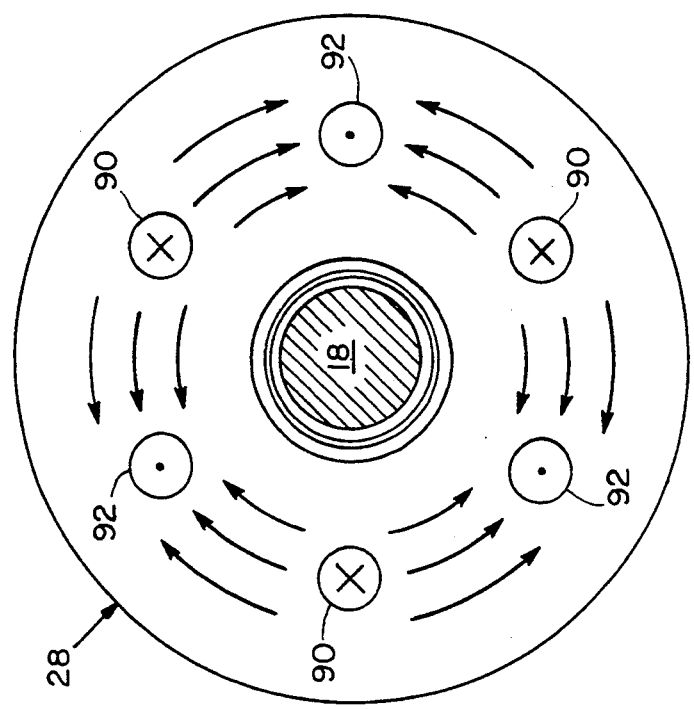
FIG. 4 is a plan view of the return element depicting the azimuthal flux path in the machine of FIG. 1.

The return element portion element of end caps 28 and 30 (FIG. 1) support a flux path, as shown in FIG. 4 with respect to end cap 28. There it can be seen that the flux flows azimuthally through the magnetic material. It enters in areas 90 and exits in areas 92. This depiction represents the flux at a particular instant of time. The pattern itself moves azimuthally with time.

Figure 5:
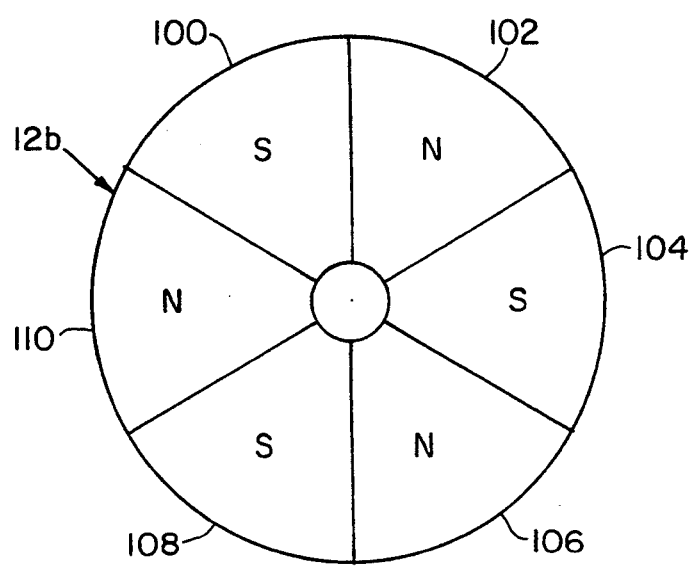
FIG. 5 is a plan view of a rotor of the machine of claim 1 constructed for operation as a permanent magnet synchronous rotary machine.
Figure 6:
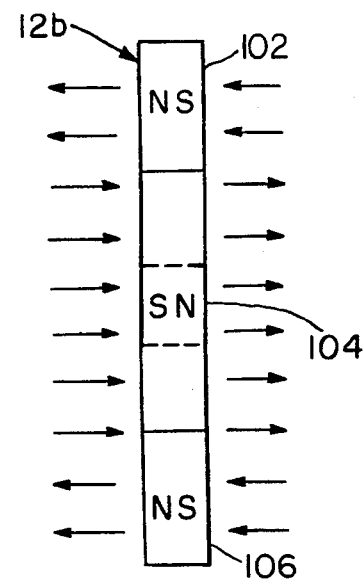
FIG. 6 is a side view of the rotor of FIG. 5.

If machine 10, FIG. 1, were implemented as a permanent magnet synchronous machine, the stator disks would be constructed in the same way, but the rotor disks would be constructed differently as shown with respect to rotor disk 12b, FIG. 5. This rotor disk is constructed of permanent magnet material. The six poles 100, 102, 104, 106, 108 and 110 can be constructed by magnetizing the disk appropriately or using six discrete permanent magnets installed or potted into the host disk. With rotor disks 12b, the flux flows into the paper at the south poles and out of the paper at the north poles. The axial polarization of poles 100–110 can be seen more clearly in the side view, FIG. 6, where the arrows graphically depict the flux directions.

Figure 7:
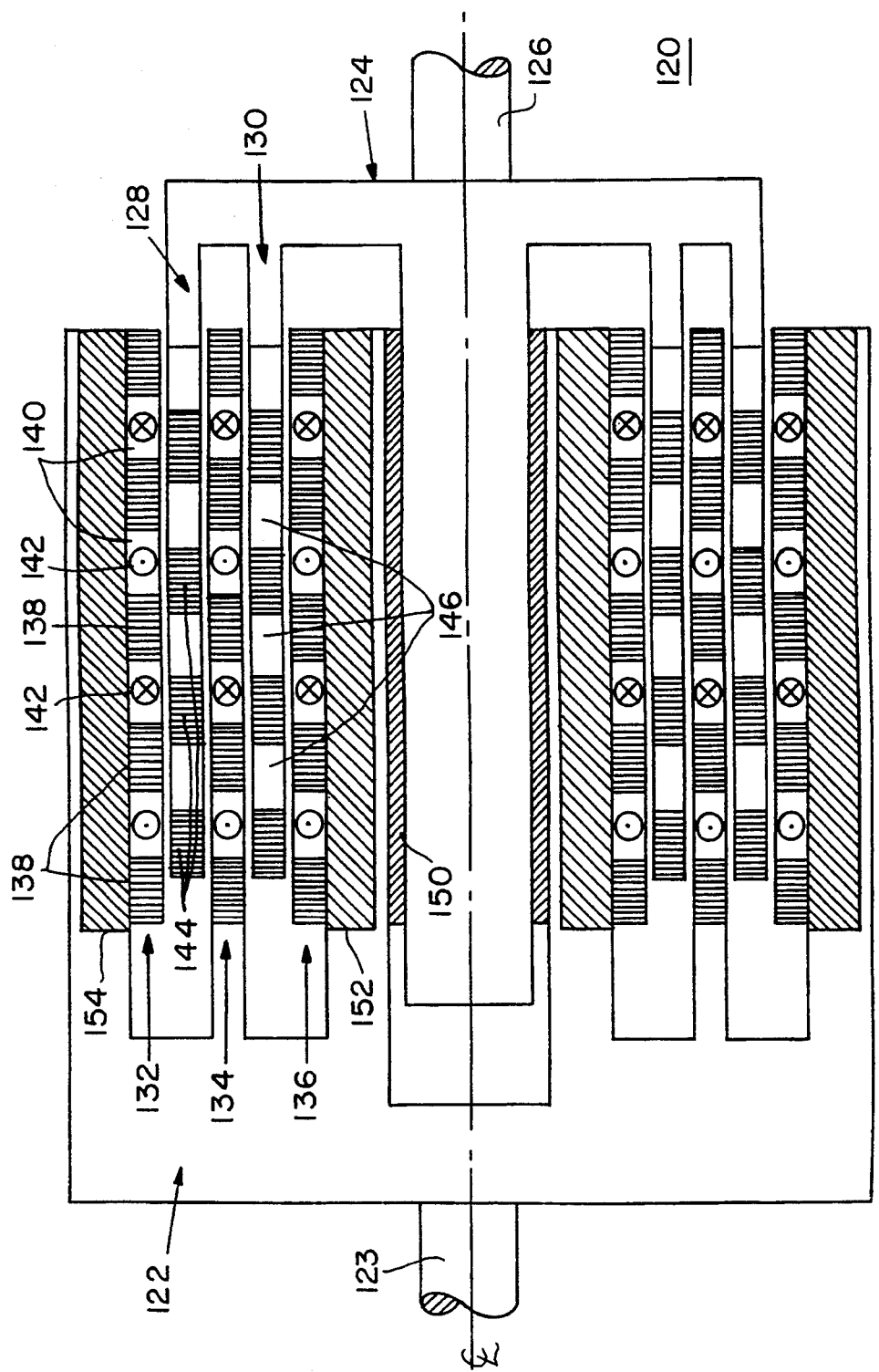
FIG. 7 is a diagrammatic cross-sectional view of an a.c. linear induction machine according to this invention which may be cylindrical or planar in construction.
Figure 8:
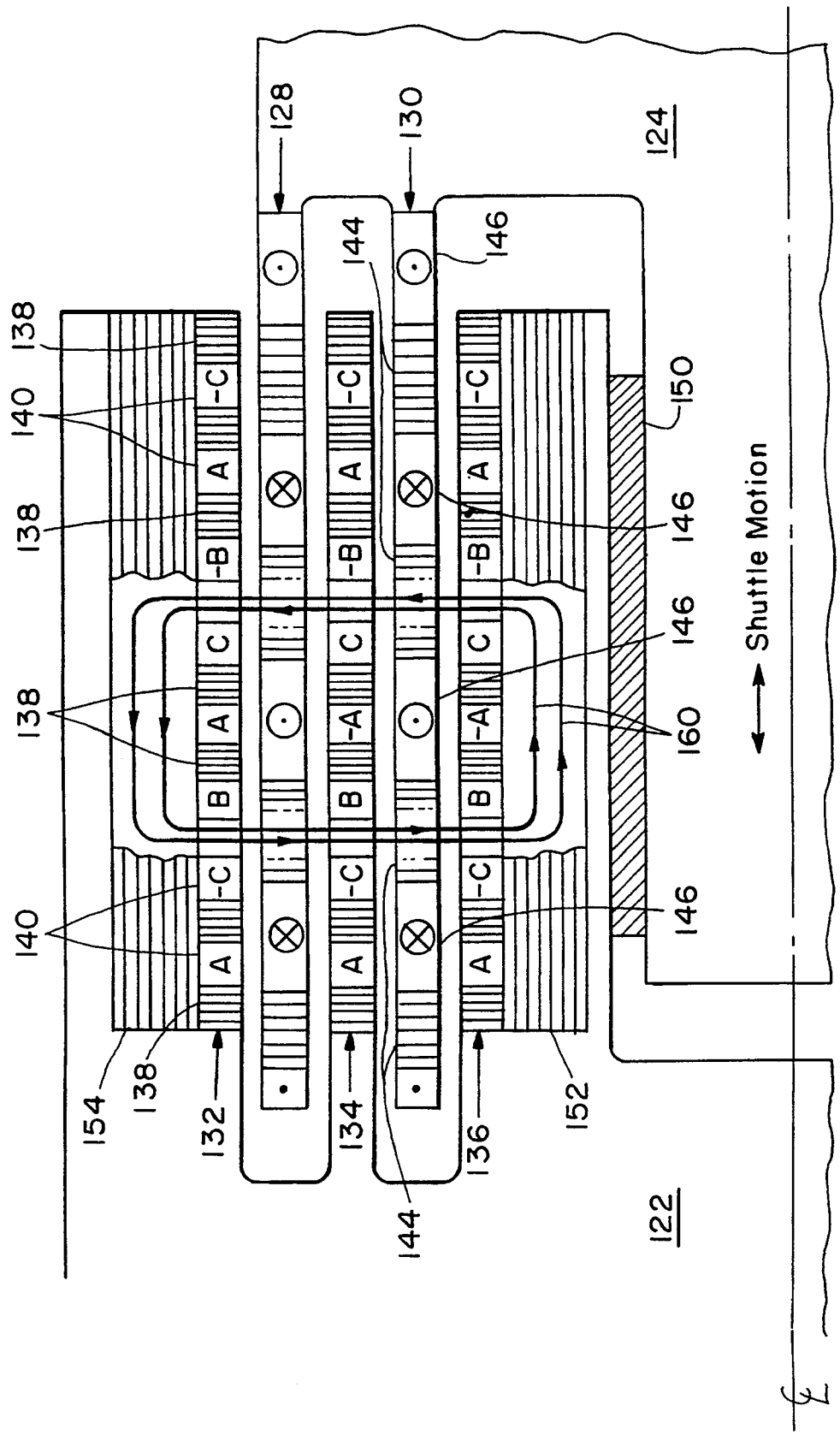
FIG. 8 is an enlarged view of a portion of the linear induction machine of FIG. 7 showing the windings and induced current flows.

Although thus far the invention has been shown with respect to rotary machines of the permanent magnet synchronous type and the induction type, this is not a necessary limitation of the invention. For example, as shown with respect to FIG. 7, the machines can be implemented with linear mechanisms. The side cross-sectional view of FIG. 7 depicts a linear mechanism which may be either planar or cylindrical in topology. Linear electrical machine 120, FIG. 7, includes an armature or stator assembly 122 connected to a mechanical ground by shaft 123, and a plunger or shuttle assembly 124 akin to the rotor assembly of a rotary machine, which provides the power output on shaft 126. In a cylindrical form, shuttle assembly 124 includes two shuttles 128 and 130, while stator assembly 122 includes three stators 132, 134 and 136. Similarly to the rotary embodiments, stators 132, 134 and 136, as represented by stator 132, each includes a plurality of teeth 138 separated by slots 140, in which are located the windings 142. Shuttles 128 and 130, when implementing an induction machine, as exemplified by shuttle 128, include a plurality of teeth 144 separated by conductive slots 146. Bearing 150 establishes relative radial position between shuttle shaft 126 and stator assembly 122. The inner 152 and outer 154 back iron portions complete the return path for the magnetic flux. These back irons are shown disproportionately thin. More accurately, they are four times thicker than shown in FIG. 7. The linear machine operates in the same way as the rotary machine according to this invention, except that the flux and current flows that occur axially in a rotary machine occur radially in the linear machine, and those that occur azimuthally in the rotor machine occur axially in the linear machine. The enlarged detail view in FIG. 7 of the diagram of FIG. 8 shows with greater particularity the orientation of the three phases of current flow indicated as A, —A, B, —B, C and —C, located in the same slots 140 and the typical flux path is indicated at 160 with portions of the inner back iron broken away for clarity.

Figure 9:
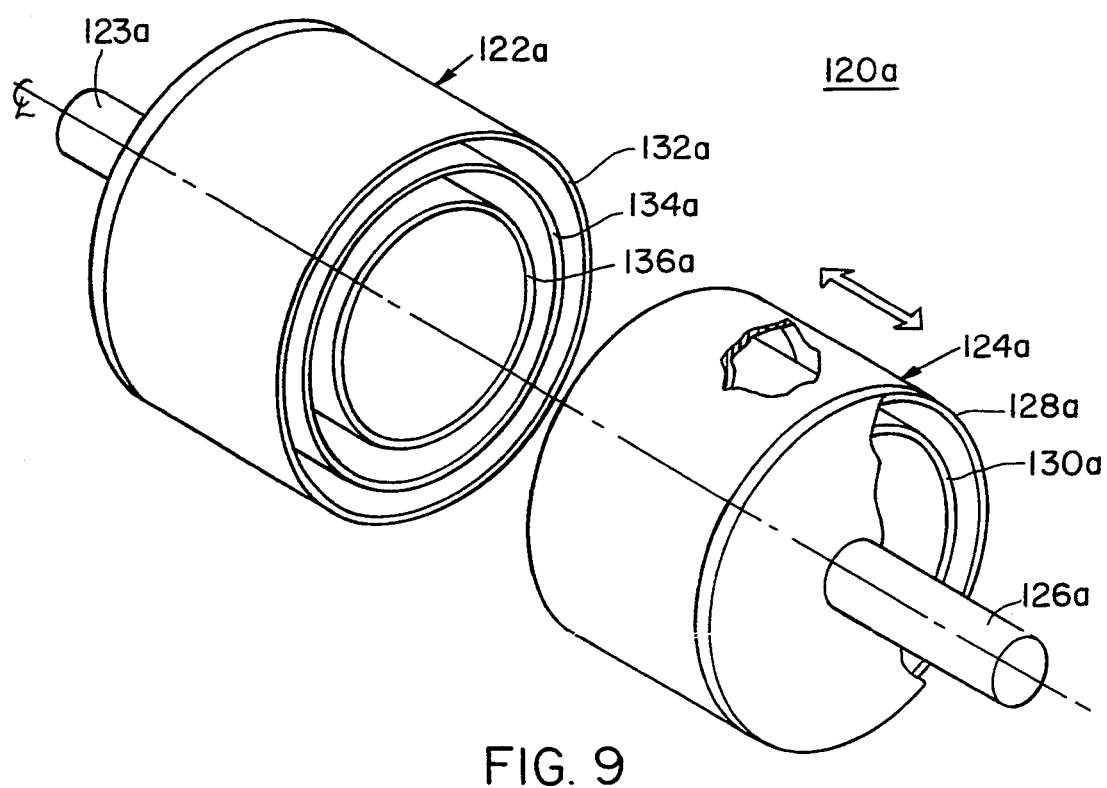
FIG. 9 is an exploded diagrammatic three-dimensional view of the linear machine of FIGS. 7 and 8 implemented with a cylindrical topology.

In the cylindrical implementation, linear machine 120a appears as shown in FIG. 9, where stators 132a, 134a and 136a are formed as cylinders, and specifically in this instance they are right circular cylinders, as are shuttles 128a and 130a. Of course, other cylindrical shapes could be used.

Figure 10:
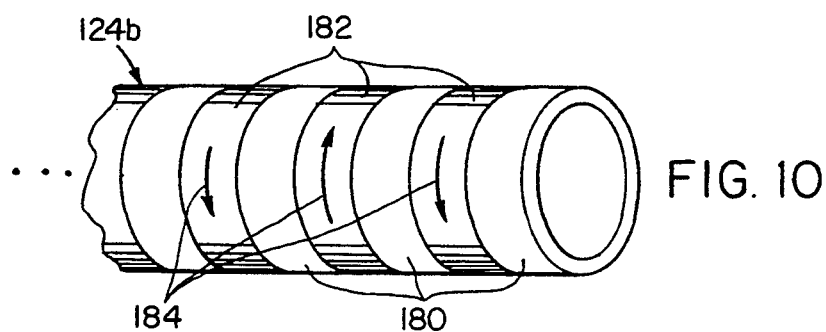
FIG. 10 is a diagrammatic three-dimensional view of the shuttle for the machine of FIGS. 7 and 8 when it is implemented with cylindrical topology as an induction machine.

When linear machine 120 is constructed as an induction machine, shuttle 124b, FIG. 10, can be formed of alternate rings of magnetic material 180, such as iron, with the intermediate rings 182 being formed of some suitable conductor such as copper, where the current flow is depicted by arrows 184.

Figure 11:
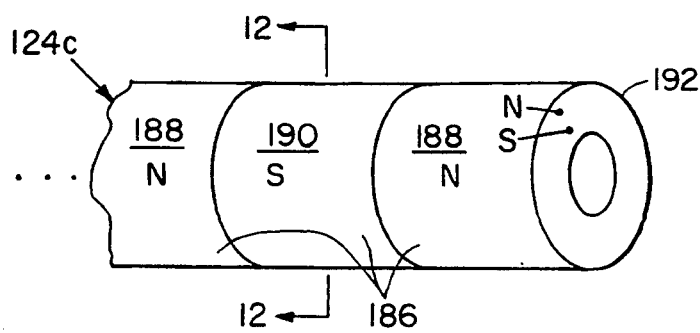
FIG. 11 is a view similar to FIG. 10 of the shuttle when it is implemented as a permanent magnet synchronous machine.
Figure 12:
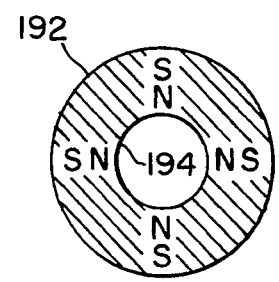
FIG. 12 is a sectional view along lines 12—12 of FIG. 11.

Alternatively, in the permanent magnet synchronous machine, shuttle 124c, FIG. 11, is formed of alternating magnetic rings 186 in which alternate ones 188 are polarized with their north poles on the circumference and the intermediate ones 190 have their south poles on the circumference. The polarization can be better seen in FIG. 12, which is a sectional view taken along line 12—12 of FIG. 11 through ring or annular portion 190, where the plurality at the circumference 192 is south polarized and the interior surface 194 of the annular ring is north polarized.

Figure 13:
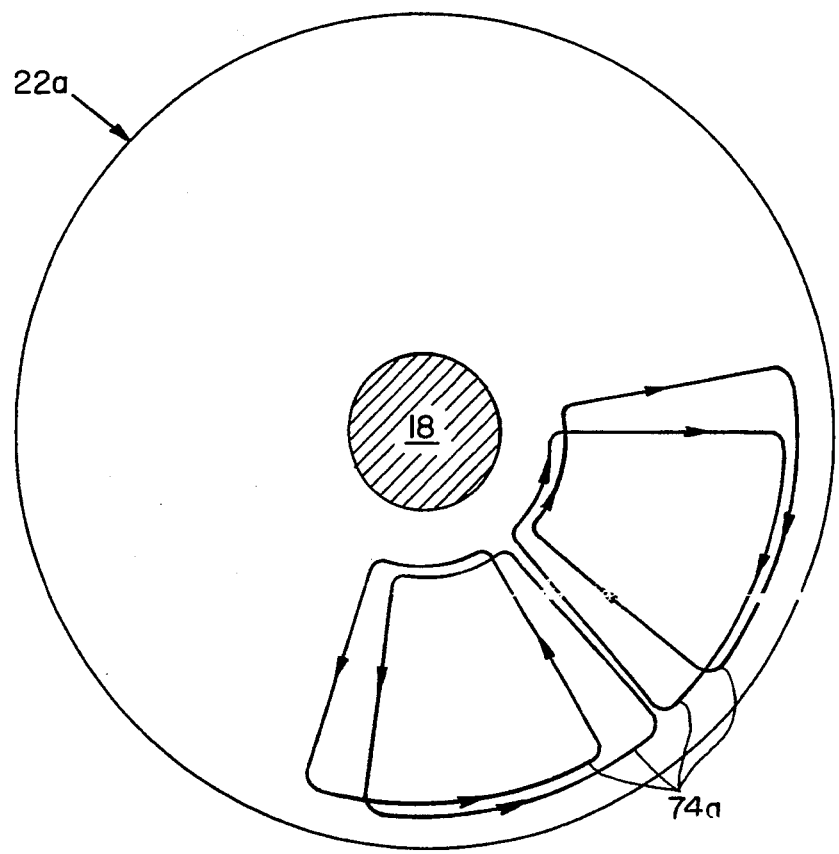
FIG. 13 is a plan view of a stator disk without teeth similar to that of FIG. 2 for a permanent magnet synchronous machine.

Although thus far the stators are all shown with teeth, this is not a necessary limitation of the invention. For a toothless stator 22a, FIG. 13, having three phase windings of which only four coils 74a of phase A are shown completing the winding pattern all the way around would result in twelve coils. Phases B and C would be the same but displaced 40° and 80°, respectively, relative to phase A.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A rotary induction machine comprising:
   a plurality of axially spaced rotors;
   a plurality of axially spaced stators interstitially disposed with said rotors;
   a plurality of magnetically isolated magnetic teeth on each of said rotors and said stators, the plurality of teeth on each rotor being different in number from the plurality of teeth on each stator;
   return means including magnetic material for establishing a low reluctance azimuthal flux path;
   a plurality of conductor paths surrounding said teeth on each said rotor; and
   a plurality of electrical windings on each stator, each winding surrounding a different group of magnetic teeth for inducing a magnetic flux axially in a path in series through corresponding groups of teeth on successive rotor and stator disks and returning azimuthally through said return means.

2. The rotary induction machine of claim 1 in which said rotors and stators are disk shaped.

3. The rotary induction machine of claim 2 in which said magnetic teeth are embedded in the disk shaped rotors and stators.

4. The rotary induction machine of claim 1 in which said magnetic teeth are laminated.

5. The rotary induction machine of claim 1 in which there are more magnetic teeth on the stator than on the rotor.

6. The rotary induction machine of claim 1 in which said rotors include non-magnetic material.

7. The rotary induction machine of claim 1 in which said stators include non-magnetic, non-conducting material.

8. The rotary induction machine of claim 1 in which said rotor is made of conducting material for establishing said conductor paths.

9. The rotary induction machine of claim 1 in which said electrical windings are integral with each stator.

10. The rotary induction machine of claim 1 in which said return means include generally disk-shaped members forming end caps of the machine.

11. An a.c. rotary electrical machine comprising:
    a plurality of axially spaced rotors;
    a plurality of axial spaced stators interstitially disposed with said rotors;
    a plurality of magnetically isolated magnetic teeth on each of said stators;
    a plurality of electrical windings on each stator, each winding surrounding a different group of magnetic teeth; and
    return means including magnetic material for establishing a magnetic flux path axially in series through corresponding groups of teeth on successive stators, and interstitial rotors, and azimuthally in said return means; and said machine is a rotary induction machine, said rotors each include a plurality of magnetic teeth; number of teeth on each rotor being different from a number on each stator, and there are a plurality of conductor paths said teeth on each rotor.

12. The a.c. rotary electrical machine of claim 11 in which said machine is a permanent magnet rotary synchronous machine, said rotors are multipole and axially magnetized, and each pole of each multipole rotor induces a magnetic flux in said magnetic flux path axially in series through corresponding groups of teeth on successive stators and poles of the rotors.

13. An a.c. electrical machine comprising:

a plurality of first elements spaced from each other, each including a plurality of magnetically isolated magnetic teeth;

a plurality of second elements spaced from each other and interstitially disposed with said first elements;

a plurality of electrical windings on each of said first elements, each winding associated with a different group of magnetic teeth for providing a current flow in a first direction; and return means for completing a magnetic flux path in a second direction perpendicular to said first direction through corresponding groups of teeth on successive said first elements and through said second elements for generating a force in a third mutually perpendicular direction between said first and second elements; said machine is an induction machine, said second elements each include a plurality of magnetic teeth, a number of teeth on each second element is different from number of said teeth of on each first element, and there are a plurality of conductor paths surrounding said teeth of each second element.

14. The a.c. electrical machine of claim 13 in which said machine is a rotary machine, said first elements are stators, said second elements are rotors, said first direction is radial, said second direction is axial, and said third direction is circumferential.

* * * * *